(No Model.)

L. W. STOCKWELL.
ELECTRIC MOTOR.

No. 284,255. Patented Sept. 4, 1883.

ATTEST
Luther Day.
E. T. Richardson

INVENTOR
Levi W. Stockwell
by Bradford Howland
attorney.

UNITED STATES PATENT OFFICE.

LEVI W. STOCKWELL, OF CLEVELAND, OHIO.

ELECTRIC MOTOR.

SPECIFICATION forming part of Letters Patent No. 284,255, dated September 4, 1883.

Application filed December 19, 1882. (No model.)

*To all whom it may concern:*

Be it known that I, LEVI W. STOCKWELL, of Cleveland, Ohio, have invented a new and useful Improvement in Electromotors, of which the following is a specification.

This invention relates to a non-conducting commutator having narrow conducting-strips across its face, and connected by wire brushes extending from each binding-post around the opposite side of the commutator.

Figure 2:
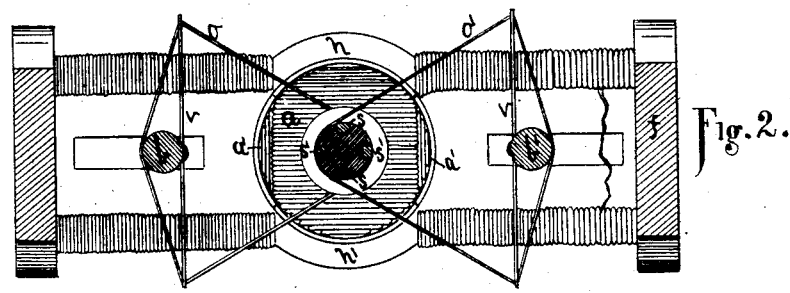
Figure 1:
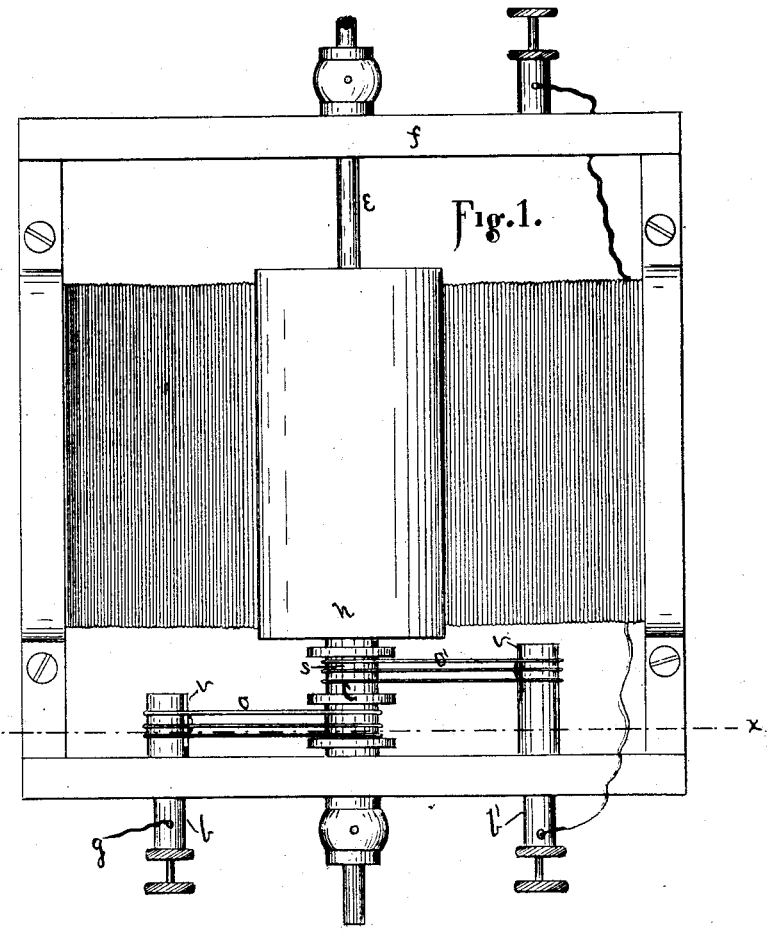

In the drawings forming a part of this specification, Figure 1 is a plan, and Fig. 2 is a vertical section at the line $x$ in Fig. 1.

The rotating armature is formed with two sections, $a$ $a'$, one beyond the other, on the armature-shaft $e$, and wound with wire coils at right angles to each other relative to the shaft $e$. The axis or shaft $e$ is supported by frame $f$, with the armature $a$ $a'$ in position between the field-magnet poles $n$ $n'$. Commutator $c$ on shaft $e$ is in the form of a double pulley, and is connected by wire brushes $o$ $o'$ with binding-posts $b$ $b$. Each of the brushes $o$ $o'$ extends over the notched ends of one of the thin bars $v$, attached vertically to the binding-post, and around and in contact with the opposite side of commutator $c$. It is preferable that bar $v$ should be a light spring for the purpose of holding brush $o$ in contact with commutator $c$ with as little pressure as possible to avoid unnecessary friction between the commutator and brush. The terminals of the coiled wires on sections $a$ $a'$ of the armature are connected with narrow metallic strips $s$ $s$ $s'$ $s'$ at equal distances apart across the face of commutator $c$, the terminals of each coil being connected with two strips on opposite sides of the commutator. With the exception of these strips the commutator $c$ is a non-conductor, being constructed of rubber or other suitable material. Brushes $o$ $o'$ are of wire; but they may be of any substance or form suitable for the purpose of conducting electricity between the binding-posts and commutator-strips $s$. The spring-bar $v$ should be of sufficient length to leave about one-eighth of the circumference of commutator $c$ at the top, and also at the bottom, free from contact with either of the brushes $o$ $o'$, in order that the entire current may pass through that armature-coil whose poles are a quarter of a circle from or midway between the field-magnet poles $n$ $n'$. Thus in Fig. 2 strips $s$ $s$ are not in contact with either of the brushes $o$ $o'$, and hence the current from battery-wire $g$ does not pass from brush $o$ through strips $s$ $s$ and the coil of armature-section $a$, whose poles are in line with poles $n$ $n'$ of the field-magnet; but the entire current does pass from brush $o$, which is in contact with strips $s'$, through the coil of the other armature-section, $a'$, whose poles are midway between field-magnet poles $n$ $n'$. When by the rotation of the armature the poles of neither of its two sections $a$ $a'$ are in vertical line, or nearly so, with poles $n$ $n'$, brushes $o$ $o'$ are in contact with all of the strips $s$ $s$ $s'$ $s'$, and therefore the current is divided between the two sections $a$ $a'$ of the armature.

Heretofore brushes extending across the face of a commutator formed with grooves or non-conducting strips across its face have been used to change the magnetic polarity.

In my electromotor herein described the change of polarity is made by means of narrow conducting-springs $s$ $s'$ in a non-conducting commutator, $c$, being brought by the rotation of the armature successively in contact with each of the brushes $o$ $o'$, which is in contact with nearly one-half of the circumference of commutator $c$.

It is obvious that in place of strips $s$ $s'$ the terminals of the armature-coils may be made to extend across the face of commutator $c$, to be brought directly in contact with brushes $o$ $o'$.

I claim as my invention—

1. In an electromotor or electro-magnetic machine, a non-conducting commutator having narrow conducting-strips across its face, in combination with a rotary armature and conducting-brushes extending around on opposite sides of the commutator and in contact therewith, substantially as described.

2. In an electromotor, the brushes $o$ $o'$, each being in contact with nearly one-half of the circumference of commutator $c$ on opposite sides, in combination with the commutator and a rotary armature, substantially as described.

3. In an electromotor, the binding-posts and commutator, in combination with and connected by bars $v$ and brushes $o\,o'$, substantially as described.

4. In an electromotor, a commutator-brush having both its ends connected with the binding-post, in combination with and extending around and in contact with the opposite side of the commutator, substantially as described.

5. The spring-bar $v$, in combination with brush $o$ and the binding-post, substantially as described.

LEVI W. STOCKWELL.

Witnesses:
 JAMES H. HOYT,
 WILBUR PARKER.